(12) United States Patent
McGriskin et al.

(10) Patent No.: US 10,023,253 B2
(45) Date of Patent: Jul. 17, 2018

(54) BICYCLE FORK PROTECTOR

(71) Applicant: Bopworx Limited, Lisnaskea (GB)

(72) Inventors: Paul Gerard McGriskin, Lisnaskea (GB); Ciara Anne McGriskin, Lisnaskea (GB); Cian Desmond O'Sullivan, Limerick (IE)

(73) Assignee: BOPWORX LIMITED, Lisnaskea (GB)

( * ) Notice: Subject to any disclaimer, the term of this patent is extended or adjusted under 35 U.S.C. 154(b) by 0 days.

(21) Appl. No.: 15/105,994

(22) PCT Filed: Dec. 17, 2014

(86) PCT No.: PCT/GB2014/000515
§ 371 (c)(1),
(2) Date: Jun. 17, 2016

(87) PCT Pub. No.: WO2015/092348
PCT Pub. Date: Jun. 25, 2015

(65) Prior Publication Data
US 2017/0001673 A1  Jan. 5, 2017

(30) Foreign Application Priority Data

Dec. 18, 2013 (GB) .................................. 1322368.0
Dec. 23, 2013 (GB) .................................. 1322875.4

(51) Int. Cl.
*B60G 5/00* (2006.01)
*B62K 25/04* (2006.01)
(Continued)

(52) U.S. Cl.
CPC ............. *B62H 3/00* (2013.01); *B25H 1/0014* (2013.01); *B62J 23/00* (2013.01)

(58) Field of Classification Search
CPC ... B62H 3/00; B62H 3/04; B62H 3/10; B25H 1/00; B62M 9/128
(Continued)

(56) References Cited

U.S. PATENT DOCUMENTS 1,576,048 A * 3/1926 Hoffman .................. B62H 3/00
                                                    211/20
4,770,431 A    9/1988 Kulik
(Continued)

FOREIGN PATENT DOCUMENTS

CN      2115991 U      9/1992
DE   102006003899 A1  11/2007
(Continued)

OTHER PUBLICATIONS

Apr. 27, 2010 URL:https//web.archieve.rog/web/20100427054950/ http://www.profirad.de/minoura-vergo-excel-hinterbauhalter-p-15436.html [retrieved on Jul. 19, 2017] (hereinafter D1).*
(Continued)

*Primary Examiner* — Tony H Winner
(74) *Attorney, Agent, or Firm* — RatnerPrestia

(57) ABSTRACT

A bicycle fork protector and stand comprising a wheelset having at least one or two miniature wheels and an axle on the wheelset for engaging a bicycle fork at the bicycle dropouts to protect the fork from damage and maintain the fork blades in a correct spatial arrangement for storage and/or transport of the bicycle.

11 Claims, 10 Drawing Sheets

(51) Int. Cl.
*B62H 3/00* (2006.01)
*B25H 1/00* (2006.01)
*B62J 23/00* (2006.01)

(58) Field of Classification Search
USPC .......................................................... 280/293
See application file for complete search history.

(56) References Cited

U.S. PATENT DOCUMENTS

| | | | |
|---|---|---|---|
| 4,991,715 A | | 2/1991 | Williams |
| 5,193,831 A | | 3/1993 | Capitoli |
| 5,497,967 A | * | 3/1996 | Gantois ................ B25H 1/0014 211/22 |
| 5,669,497 A | * | 9/1997 | Evans .................... B65D 85/68 206/335 |
| 5,871,131 A | | 2/1999 | Low et al. |
| 6,036,069 A | * | 3/2000 | Sayegh ................... B60R 9/048 224/324 |
| 6,293,560 B1 | * | 9/2001 | Byatt ...................... B62K 25/00 280/5.2 |
| 7,857,333 B2 | * | 12/2010 | Contarino ................ B60G 5/00 280/124.111 |
| 2010/0065800 A1 | * | 3/2010 | Giustini ............... B25H 1/0014 254/8 R |

FOREIGN PATENT DOCUMENTS

| | | |
|---|---|---|
| DE | 102011010578 A1 | 8/2012 |
| JP | 2004161020 | 6/2004 |
| WO | 1998057839 A1 | 12/1998 |

OTHER PUBLICATIONS

International Preliminary Report with respect to related PCT Application No. PCT/GB2014/000515 dated Jun. 21, 2016.
International Search Report and Written Opinion with respect to related PCT Application No. PCT/GB2014/000515 dated Mar. 30, 2015.
Minoura: "Rear End Support 2", May 30, 2013 (May 30, 2013), pp. 1-2, XP002737114, Retrieved from the Internet <URL:http://www.minoura.jp/english/transport-e/rear-end-2-e.html>[.
PROFIRAD AG:"Minoura Vergo Excel Hinterbauhalter", Apr. 27, 2010 (Apr. 27, 2010), pp. 1-1, XP002737133, Retrieved from the Internet <URL:https://web.archive.org/web/20100427054950/http://www.profirad.de/minoura-vergo-excel-hinterbauhalter-p-15436.html>.

* cited by examiner

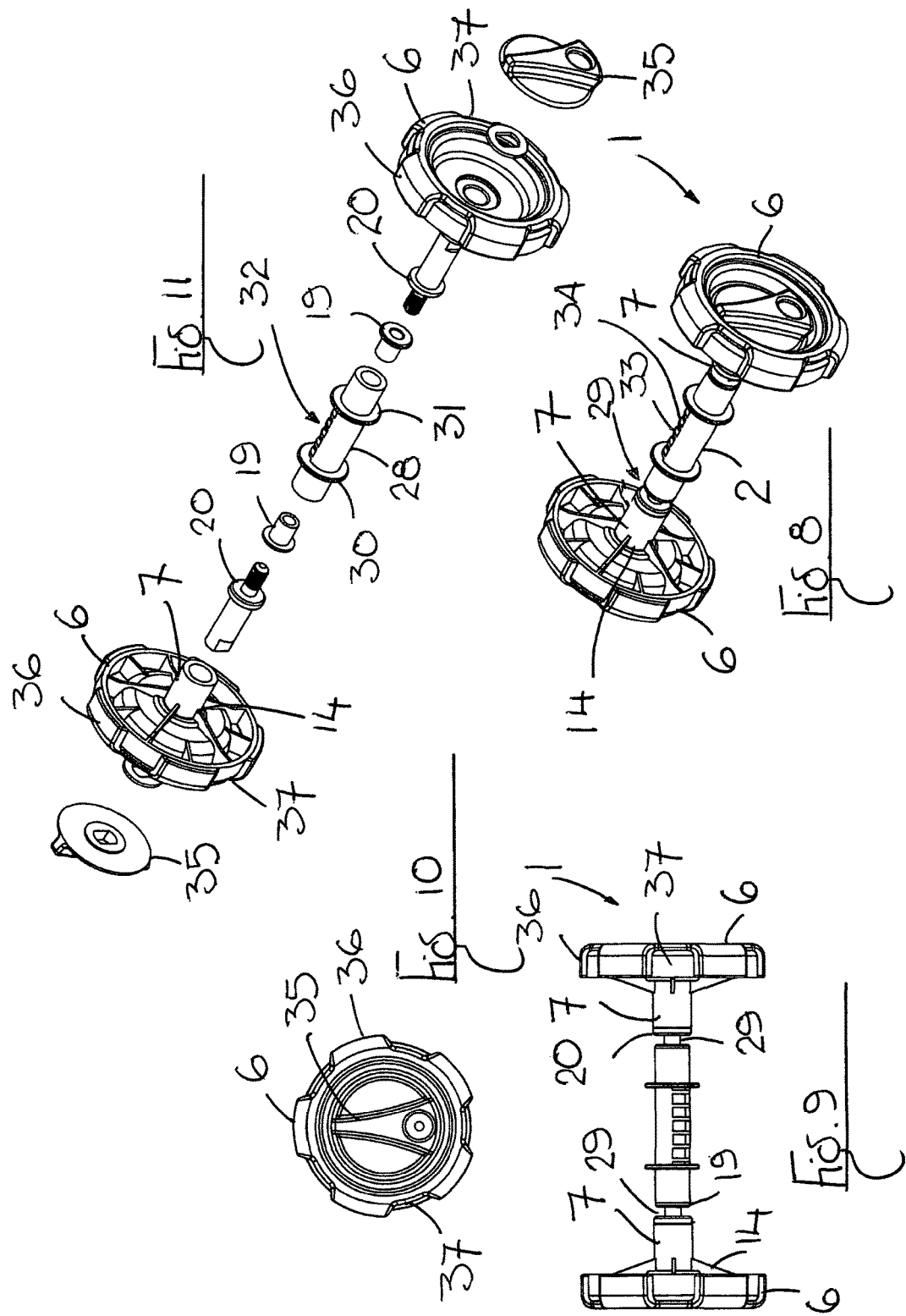

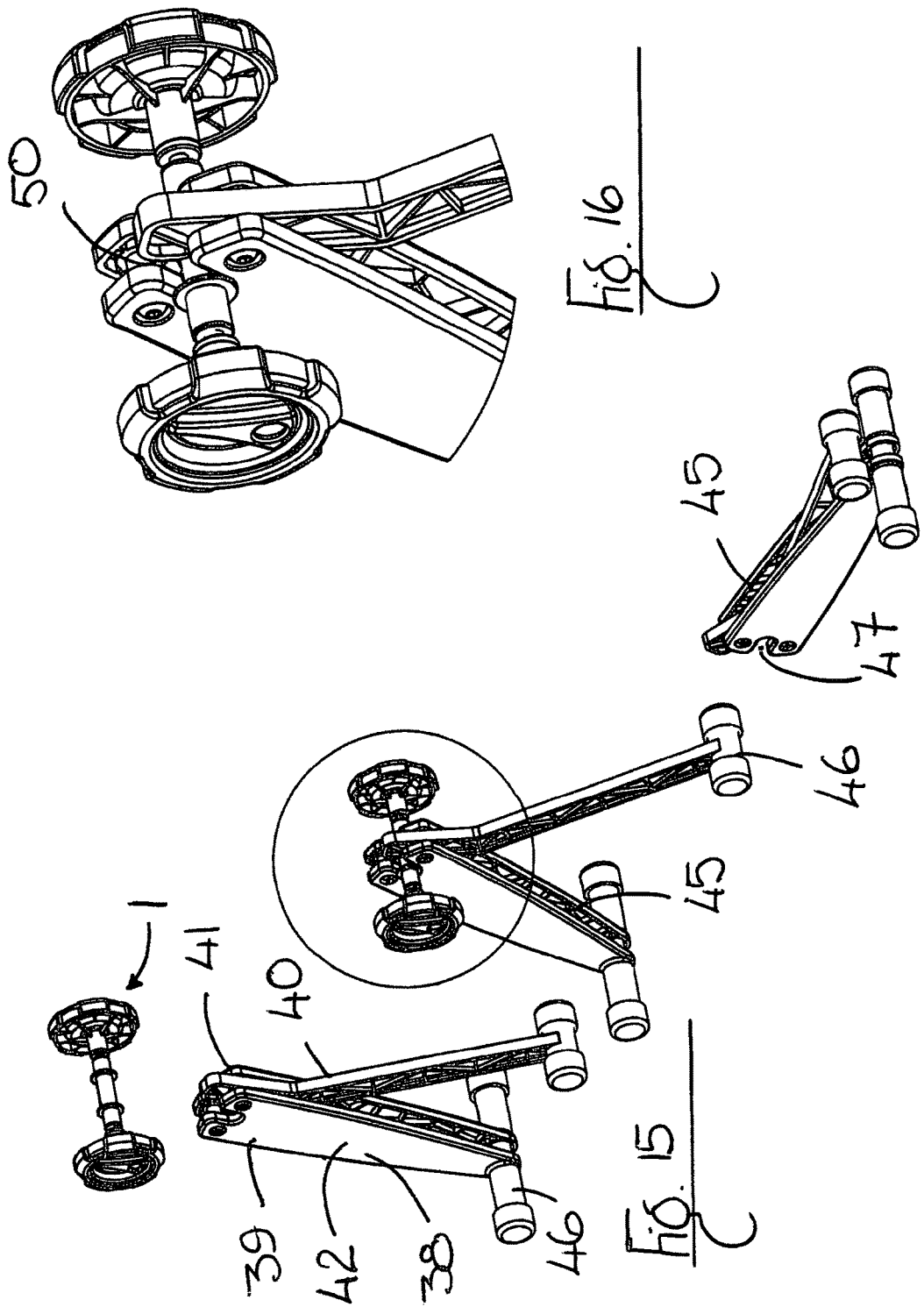

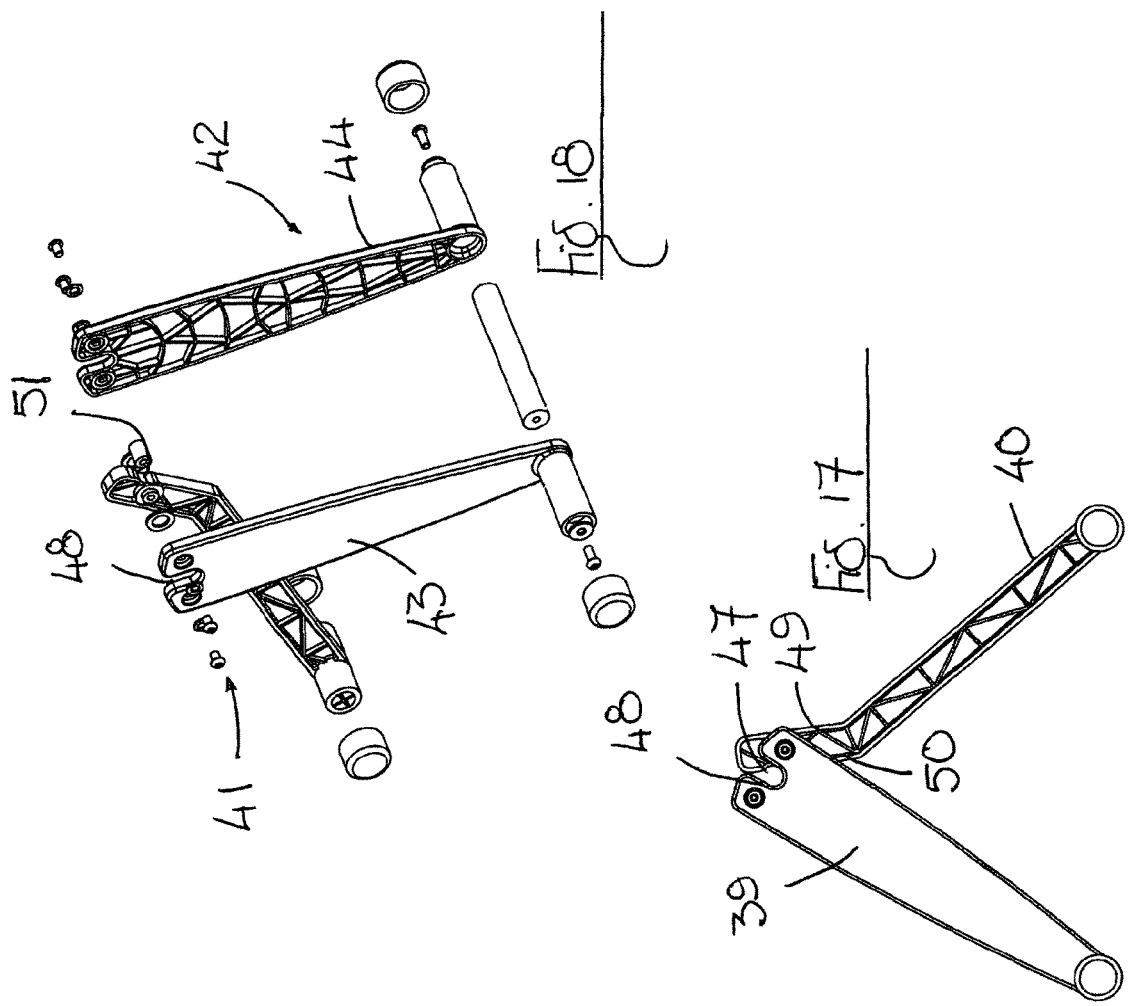

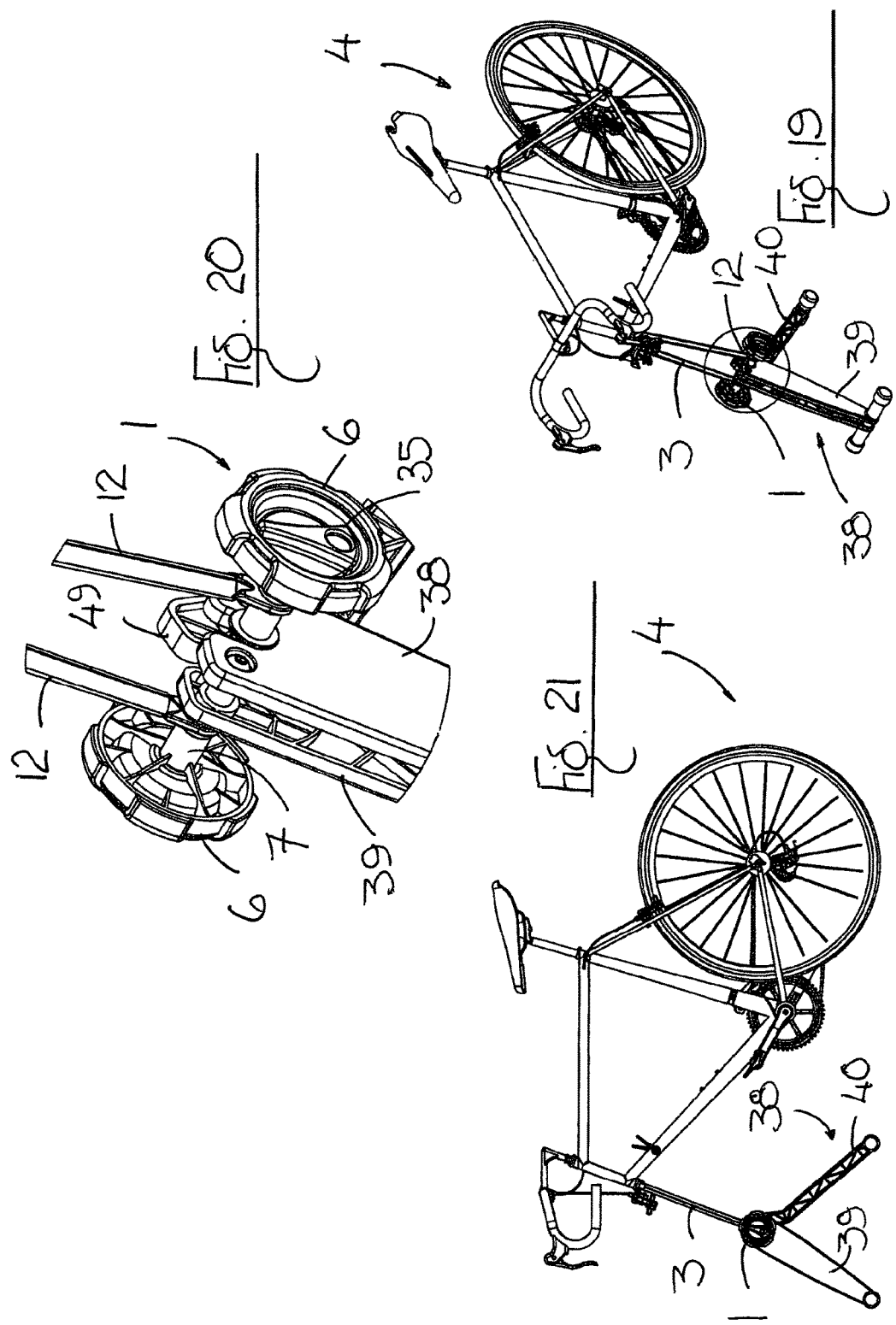

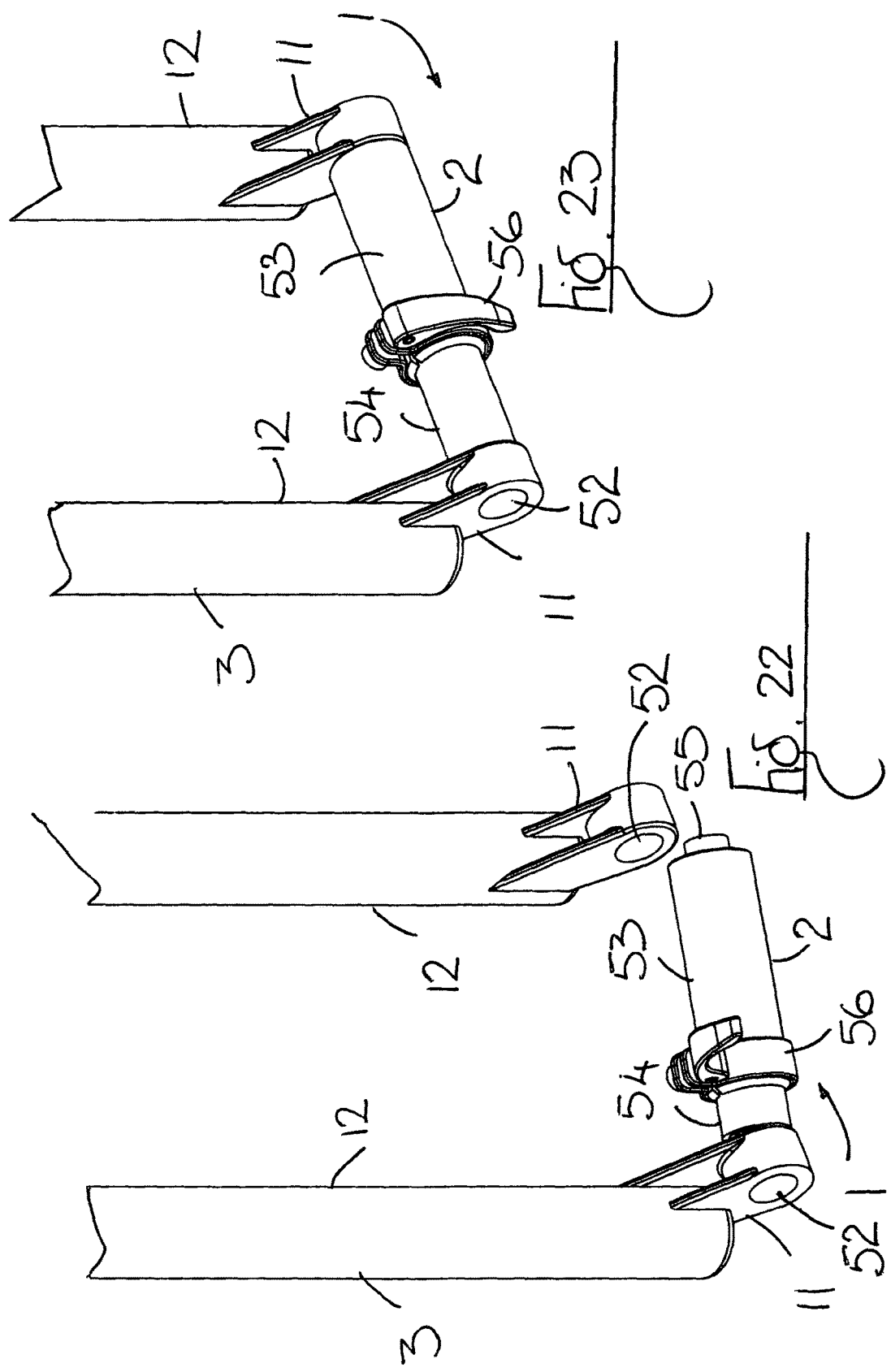

BICYCLE FORK PROTECTOR

CROSS REFERENCE TO RELATED APPLICATIONS

This application is a 35 USC 371 application of International PCT Patent Application No. PCT/GB2014/000515, filed on Dec. 17, 2014, which claims priority to Great Britain Patent Application GB1322368.0, filed Dec. 18, 2013, and Great Britain Patent Application GB1322875.4, filed Dec. 23, 2013; all of the contents of which are hereby incorporated by reference in their entireties.

FIELD OF THE INVENTION

This invention relates to a bicycle fork protector for protecting a fork, for example the front fork, of a bicycle from which the wheel, for example the front wheel, has been removed. The invention also extends to a fork protector kit comprising a fork protector and a stand.

BACKGROUND OF THE INVENTION

It is often required to remove a wheel from a bicycle. For example, the front and/or rear wheel of the bicycle may be removed for ease of loading into a vehicle and to allow the bicycle to be more easily fitted into the vehicle. Also, the front (or rear) wheel may be removed when securing a bicycle to a rack so that the front (or rear) wheel may be placed next to the rear (or front) wheel and locked to the rack using a single locking mechanism, such as a chain. However, when a wheel is removed, the fork of the bicycle to which the wheel had been attached becomes exposed. During loading (or unloading) of a bicycle into (or from) a vehicle, the exposed fork is liable to come onto contact with a surface in the vehicle, possibly causing damage to the vehicle. Such damage can be relatively superficial, for example scratching of the vehicle paintwork and/or internal plastic damage, or may be more serious such as breaking a glass window. The exposed fork, in particular the exposed dropout slots in the exposed fork, may itself become damaged when a bicycle is being loaded (or unloaded) into (from) a vehicle or when the partially disassembled bicycle is placed on the ground, for example next to a rack. Furthermore, the fork of a bicycle can be relatively expensive to repair or replace, and so there is a need to protect the exposed fork.

The front and/or rear brake callipers also become exposed when the front and/or rear wheels comprising a braking disc are removed from a bicycle. Thus, the brake calliper is more vulnerable to damage when handling the partially disassembled bicycle such as when loading the bicycle into a vehicle. Furthermore, the brake pads in the calliper can be inadvertently urged together, for example, if the brake lever is pulled when handling the bicycle. Thus, without a brake disc to maintain a space between the brake pads, the brake pads come together and prevent the brake disc being replaced between the brake pads when the wheel is reattached to the bicycle.

It would therefore be desirable to provide a device that mitigates the problems outlined above and which can advantageously protect an exposed fork, such as a bicycle's front fork, and brake calliper, such as a front brake calliper, when a wheel has been removed so as to prevent damage to the partly disassembled bicycle and/or to a vehicle into which the bicycle is being loaded.

SUMMARY OF THE INVENTION

According to the invention there is provided a bicycle fork protector comprising:
a wheelset having at least one miniature wheel, and
an axle on the wheelset for engaging a bicycle fork.
Preferably, the wheelset comprises two miniature wheels.
Optionally, one of the two miniature wheels comprises a handle.
Preferably, the at least one miniature wheel comprises a round wheel. More preferably, the at least one miniature wheel comprises at least one flat side.
Suitably, the at least one miniature wheel comprises a plurality of flat sides,
Advantageously, the at least one miniature wheel comprises grips. Preferably, the grips comprise notches in the miniature wheel.
Preferably, the at least one wheel is rotatably mounted on the axle. More preferably, the at least one wheel is rotatably mounted on the axle via a screw on/off mechanism. Alternatively, the at least one wheel is rotatably mounted on the axle via a quick release mechanism.
Preferably, the axle comprises a coupling for engaging a bicycle fork. More preferably, the coupling comprises a slot for engaging a bicycle fork dropout. Most preferably, the coupling comprises a dropout slot spacer to maintain the spatial arrangement of the fork dropouts.
Preferably, the axle comprises a telescopic axle. More preferably, the telescopic axle comprises a spring-loaded telescopic axle.
Optionally, the at least one wheel comprises a brake pad separator to separate the brake pads of the bicycle.
In a preferred embodiment of the invention, the bicycle fork protector is adapted for use with a stand to hold bicycles from which the wheel has been removed in the upright position.
Preferably, the stand comprises a fork protector mounting for holding the fork protector. More preferably, the fork protector mounting comprises a clamp-like mounting.
Suitably, the stand comprises an A-shaped stand. Preferably, the A-shaped stand comprises a major leg and a minor leg connected to the major leg at a hinge, the stand being moveable between a folded position and an upright position about the hinge.
Advantageously, the hinge comprises a dual function hinge cum clamp to clamp the fork protector in situ in the upright position.
Preferably, the major leg comprises a housing to receive the minor leg in the folded position. More preferably, the minor leg comprises a dog-leg shape.
In a further embodiment, the invention also extends to a fork protector kit comprising a fork protector as hereinbefore defined and a stand to hold the fork protector.
Preferably, the stand comprises a fork protector mounting for holding the fork protector. More preferably, the fork protector mounting comprises a clamp-like mounting.
Suitably, the stand comprises an A-shaped stand.
Preferably, the A-shaped stand comprises a major leg and a minor leg connected to the major leg at a hinge, the stand being moveable between a folded position and an upright position about the hinge.
More preferably, the hinge comprises a dual function hinge cum clamp the fork protector in situ in the upright position.

Advantageously, the major leg comprises a housing to receive the minor leg in the is folded position.

Preferably, the minor leg comprises a dog-leg shape.

Accordingly, in one aspect, the invention provides a bicycle fork protector comprising an axle adapted to reversibly engage a fork of a bicycle, and at least one wheel arranged to engage a surface and maintain the fork spaced apart from the surface, wherein the at least one wheel is pivotable about the axle.

Optionally, the at least one wheel is pivotable about a longitudinal axis of the axle.

Optionally, the axle is adapted to be coaxially engaged with the rotational axis of the fork of the bicycle about which the wheel rotates.

Optionally, the bicycle fork protector comprises one wheel, referred to herein as a first wheel.

Optionally, the first wheel comprises a stem engageable with the axle.

Optionally, the first wheel comprises a stem adapted to receive the axle. Further optionally, the first wheel comprises a stem mountable to the axle. Still further optionally, the first wheel comprises a stem pivotably mountable to the axle.

Optionally, the axle and the stem of the first wheel form an interference coupling. Further optionally, the axle and the stem of the first wheel form a pivotable interference coupling.

Optionally, the stem comprises a cavity having an open mouth to receive the axle. Optionally, the first wheel comprises a stem wherein, in use, the axle is engaged within an open mouth of the stem. Optionally the stem is hollow. Optionally at least part of the internal surface of the hollow stem comprises a threaded liner. Further optionally the stem, optionally the threaded liner, is formed from a metal. Still further optionally the metal is an alloy, and optionally the alloy is steel. Optionally, the metal is magnetic.

Optionally at least part of the outer surface of the axle is threaded. Further optionally the threaded surface of the axle is engageable with the threaded liner of the stem of the first wheel. Optionally the axle is formed of a metal. Further optionally the metal is an alloy, and optionally the alloy is steel. Optionally, the metal is magnetic.

Optionally, the bicycle fork protector comprises first and second wheels.

Optionally the bicycle fork protector comprises a second wheel engageable with the axle. Optionally the second wheel is operable to rotate the axle. Further optionally the second wheel is operable to engage, optionally clamp, the bicycle fork protector to the bicycle fork. The second wheel can be fixedly mountable to the axle to rotate the axle.

Optionally the bicycle fork protector further comprises a first washer, wherein, in use, said washer abuts the open mouth of the stem. Optionally the bicycle fork protector further comprises a second washer, wherein, in use, said washer abuts the axle and is spaced apart from the first washer.

Optionally the circumference of the second wheel is smaller than the circumference of the first wheel.

Optionally the first wheel has a plurality of substantially flat, circumferential sides. Further optionally the first wheel has a hexagonal configuration with six, substantially flat, circumferential sides.

Optionally the second wheel further comprises a strap having first and second opposing ends, wherein the first end is attached to the second wheel and the second end comprises a plate suitable for insertion between the brake pads of a brake calliper. Optionally, when not in use, the strap is housed in a recess located at the circumferential edge of the second wheel.

The invention also extends to a stand substantially as hereinbefore defined.

The fork protector of the invention facilitates the safe, temporary removal of a bicycle wheel e.g. for transport or storage by protecting the bicycle fork from damage. The miniature wheelset of the fork protector prevents the bicycle fork generally from impacting with the ground or other potentially damaging surfaces whilst also effectively protecting the dropouts and dropout slots from damage. Simultaneously, the fork protector enables easy transport and storage of the bicycle as a result of removal of the bicycle wheel(s) as required. Meanwhile, the axle of the fork protector replicates the (removed) bicycle wheel axle so that the fork blades are maintained at the correct distance apart by the fork protector of the invention during transport and storage. The prevention of damage to bicycle forks and the maintenance of the correct spatial distances and orientation of the fork components is particularly critical with highly engineered racing and professional bicycles where engineering tolerances are necessarily small to ensure optimal performance.

In particular, high performance bicycle forks are typically manufactured from materials that can be easily damaged by shear forces e.g. by deforming or breaking the forks resulting in impaired performance. The fork protector of the invention prevents such damage.

More generally, the fork protectors of the invention prevent damage to other articles that can be caused by exposed bicycle forks during storage and transport.

The fork protector of the invention can have a wheelset having one miniature wheel to protect individual fork blades or a wheelset having two miniature wheels to protect both blades simultaneously. In addition, the fork protector of the invention can protect brake callipers and pads from disruption following removal of a wheel.

The miniature wheels of the wheelset allow for the bicycle to rest on the fork protector and to be "wheeled" on the fork protector if desired while multiple sides or grips on the miniature wheels prevent uncontrolled rolling of the wheels on the ground.

The stand employed with the fork protector is designed to be simple to use. The stand and fork protector in combination allow a bicycle to be supported in the fully upright position following removal of a wheel. The fork protector can be attached to a bicycle before mounting the bicycle on the stand. Alternatively, in a simplified operation, the fork protector can be placed in the clamp cum hinge of the stand and the bicycle from which the wheel has been removed simply dropped gently at the fork onto the fork protector in the stand. More generally, the clamp cum hinge of the stand enables rapid and easy engagement of the fork protector with the stand.

The fork protector of the invention is also adapted for use with dropout slots and dropout through-holes.

BRIEF DESCRIPTION OF THE DRAWINGS

An embodiment of the present invention will now be described by way of example only with reference to the accompanying drawings in which:

FIG. 8 is perspective view from above and one side of a second embodiment of a fork protector of the invention in which the fork protector is a double fork protector provided with an axle having a wheelset made up of two protective miniature primary wheels to simultaneously protect both blades of the fork of the bicycle;

FIG. 9 is a front plan view of the double fork protector of FIG. 8;

FIG. 10 is a side elevation of the double fork protector;

FIG. 11 is an exploded perspective view from above and one side of the double fork protector;

FIG. 15 is a perspective view from above and one side of the double fork protector of FIG. 8 and associated stand, moveable between a folded position and an upright operating position, making up a fork protector kit adapted to support a bicycle with its wheel(s) removed with the stand shown in the position and the double fork protector mounted in the stand;

FIG. 16 is an enlarged perspective view from above and one side of the double fork protector mounted in the stand;

FIG. 17 is a side elevation of the double fork protector mounted in the stand;

FIG. 18 is an exploded perspective view from above and one side of the stand;

FIG. 19 is a perspective view from above and one side of a bicycle fitted with the double fork protector on the front fork and supported in the stand;

FIG. 20 is an enlarged perspective view from above and one side of the bicycle front fork, double fork protector and clamping hinge of the stand;

FIG. 21 is a side elevation of the bicycle, double fork protector and stand of FIG. 19;

FIG. 22 is a perspective view from above and one side of a third embodiment of the fork protector of the invention adapted for use with forks having through-hole dropouts in instead of slots in which the axle is replaced by a spring-loaded telescopic axle for insertion between the through-holes with the wheels of the fork protector removed for clarity and the axle inserted in a one through-hole of the fork, and FIG. 23 is a perspective view from above and one side of the fork protector of FIG. 22 with the spring-loaded telescopic axle inserted in both through-holes of the fork.

DESCRIPTION OF PREFERRED EMBODIMENTS

Figure 1:
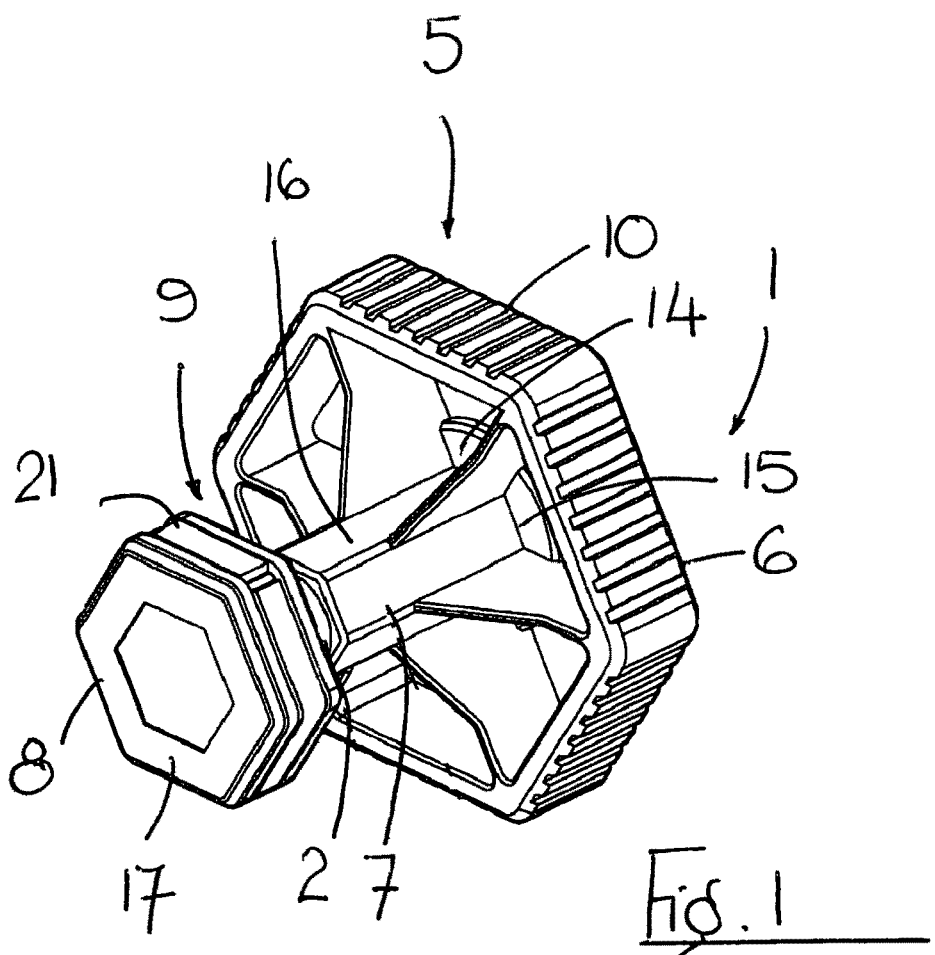
FIG. 1 is a perspective view from above and one side of a first embodiment of a bicycle fork protector of the invention.
Figure 2:
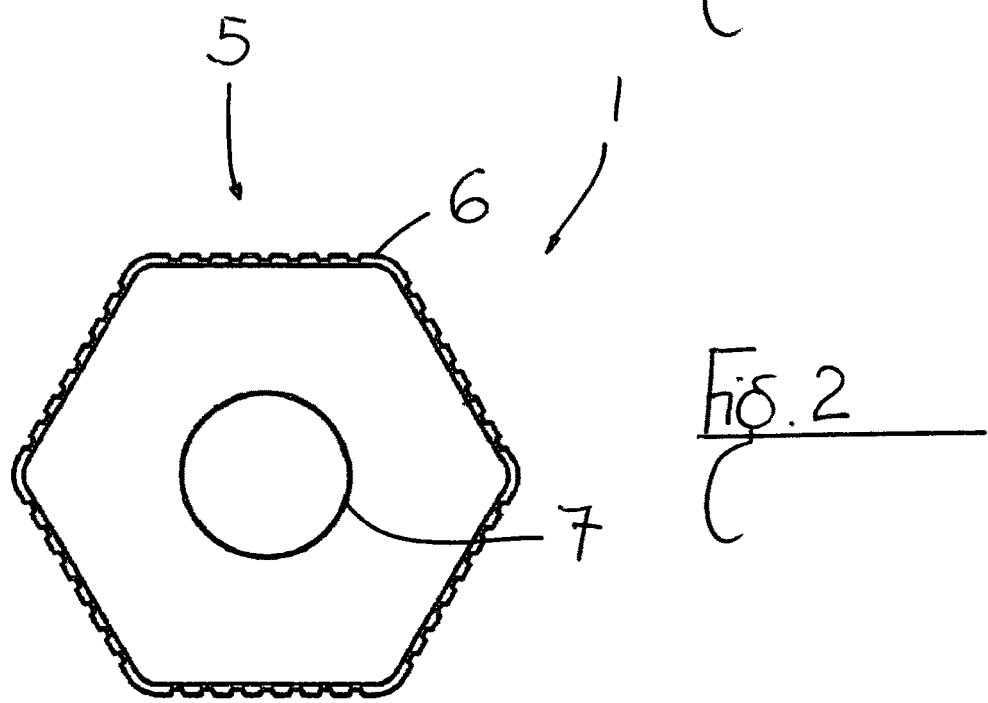
FIG. 2 is a side plan view of the fork protector of FIG. 1.
Figure 3:
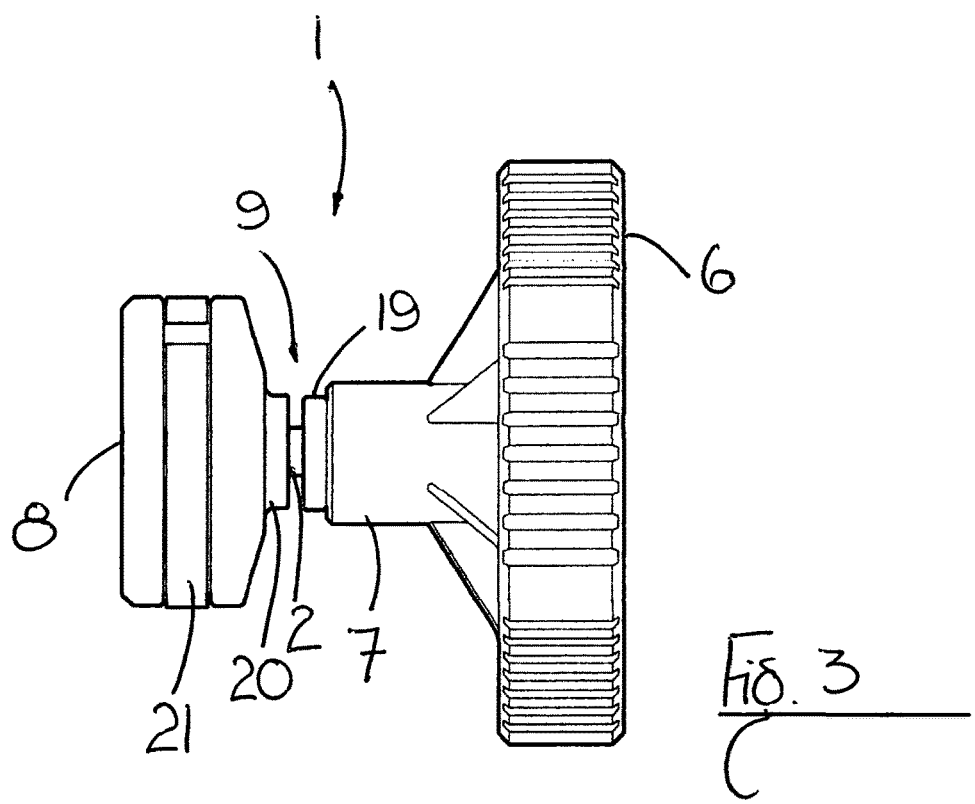
FIG. 3 is a rear plan view of the fork protector.

The present invention provides a bicycle fork protector 1 for protecting a fork of a bicycle when a wheel has been removed therefrom, also referred to as an exposed fork. The fork may be the front and/or rear fork of the bicycle. The bicycle fork protector 1 may be clamped to an exposed fork to prevent potentially damaging contact or impact between the exposed fork and a surface, such as the surface of the ground or the interior surface of a vehicle.

Thus, as shown in the drawings, the bicycle fork protector 1 of the invention comprises an axle 2 adapted to reversibly engage a fork 3 of a bicycle 4 and a wheelset 5 having at least one miniature protective primary wheel 6 pivotable about the axle 2. Each primary wheel 6 is arranged to engage a surface and maintain the fork 3 spaced apart from the surface thus avoiding damage to the fork 3 from the surface and vice versa.

The miniature protective wheels 6 of the wheelset 5 are miniature in scale compared with a bicycle wheel. More particularly, the miniature protective wheels 6 are wheel-like bodies of substantially reduced diameter compared with normal bicycle wheels and allow for compact storage of bicycles 4 by allowing safe removal of the wheels whilst protecting the bicycle forks. As will be appreciated by those skilled in the art from the following description, the miniature or reduced size wheel-like bodies can be sized to optimise storage or transport of bicycles 4. Moreover, although referred to as "wheels", as will be apparent from the following description, the wheels 6 can be shaped to have circular, straight, notched or irregular sides as required to prevent undesired rolling of the wheels 6.

Referring to FIG. 1, there is shown an embodiment of the bicycle fork protector 1 of the invention having an axle 2, a first miniature wheel 6 comprising a stem 7 engaging the axle 2, and a secondary miniature wheel 8 engaging the axle 2. Thus, the first or primary wheel 6 may reversibly engage a first end of the axle 2 and the secondary wheel 8 may reversibly engage the other end of the axle 2.

Advantageously, the first wheel 6 is freely pivotable about the axle 2 when engaging the axle 2 as well as when clamped to the fork 3 of a bicycle 4. The first wheel 6 is pivotably mountable to the axle 2, for example by forming a pivotable coupling 9 by way of an interference fit between the first wheel 6 and the axle 2.

The axle 2 may engage the first wheel 6 by any suitable means such as a screw on/screw off mechanism. For example, the first wheel 6 may comprise a stem 7 which may be suitably sized to receive and engage the axle 2. Thus, optionally, the stem 7 may comprise a hollow core to receive the axle 2. In certain embodiments, the walls, i.e. the interior walls, of the stem 7 comprise a threaded liner. The threaded liner may correspond to threads on at least part of the surface of the axle 2 and thus the axle 2 may engage the stem 7 by screwing the axle into the hollow core of the stem 7.

Furthermore, the axle 2 may be attached to, or integrally formed with, a second wheel 8. Alternatively, the axle 2 may be releasably engaged with the second wheel 8.

The first wheel 6 of the bicycle fork protector 1 may be formed from any suitable material. Advantageously, the first wheel 6 may be formed from a material such as semi-hard rubber. The stem 7 of the first wheel 6 may be formed from the same material as the first wheel 6 or may be formed from a different material, such as plastics. The stem 7 may comprise a threaded liner affixed to, or integrally formed with, the interior wall of the hollow core of the stem 7 suitable to engage the axle 2. The threaded liner may be formed from any suitable material. The threaded liner may be formed from the same material as the stem 7 or may be formed of a different material. Thus, the threaded liner may be formed from a metal; optionally, the metal may be an alloy such as steel. The threaded liner may, for example, be formed from a screw-in insert nut suitable to receive and engage the axle 2. The axle 2 may be formed from any suitable material. Thus the axle 2 may be formed from a metal; optionally, the metal may be an alloy such as steel. Advantageously, the metal components of the bicycle fork protector 1 may be magnetic. The magnetic properties of these components may advantageously aid the assembly of the bicycle fork protector 1 by biasing the components together.

The first wheel 6 may comprise a circular configuration. Advantageously, first wheel 6 may comprise a polygonal configuration. Thus, the first wheel 6 may thus have a plurality of substantially flat, circumferential sides 10. The number of sides 10 is not particularly limited and may be 3, 4, 5, 6, 7, 8, 9, 10 or more. In a preferred embodiment, the first wheel 6 has a hexagonal configuration with six substantially flat circumferential sides 10. In use, the plurality of flat circumferential sides 10 allows the pivotable first wheel 6 to roll along a surface when pushed by a user, such as when a bicycle fork protector 1 comprising the first wheel 6 is clamped to the fork 3 of a bicycle 4 and the bicycle 4 is pushed/moved by the user.

Figure 4:
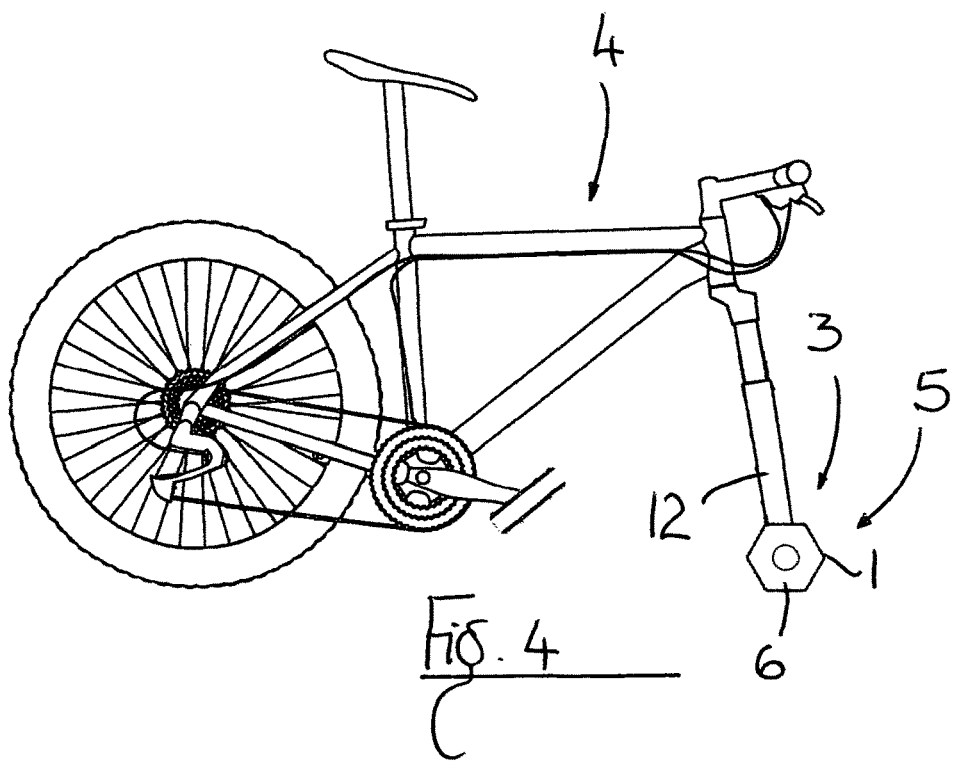
FIG. 4 is a side plan view of a bicycle having the fork protector FIG. 1 engaged with the front fork of the bicycle.
Figure 5:
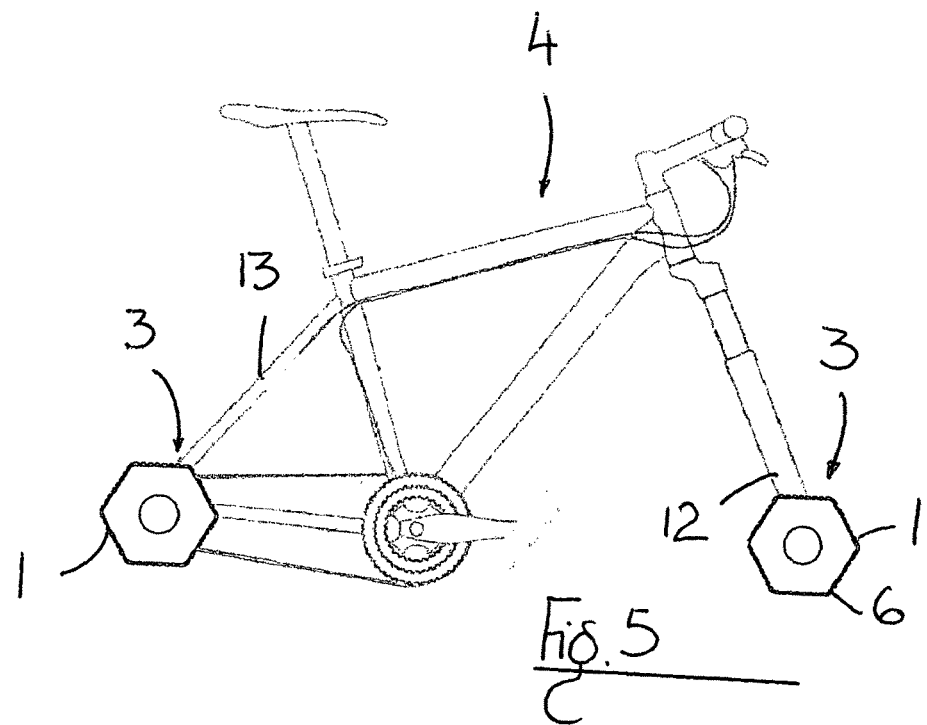
FIG. 5 is a is a side plan view of a bicycle having a fork protector engaged with each of the front and rear forks of the bicycle.

A bicycle fork protector 1 of the invention may be clamped to the exposed end or dropout 11 of each blade 12 of a bicycle fork 3. In other words, in some embodiments, two bicycle fork protectors 1 may be attached to each fork 3 of a bicycle 4. A bicycle fork protector 1 clamped to each blade 12 of the fork 3 of a bicycle 4 and/or the rear fork 13 of a bicycle 4 facilitates the bicycle 4 being maintained, unsupported, in an upright position since the first wheel 6 of each bicycle fork protector 1 contacts the surface and provides vertical standing stability to the bicycle 4 (see FIGS. 4 and 5). Advantageously, if bicycle fork protectors 1 having substantially flat circumferential sides 10 are used, the flat sides 10 prevent rolling of the bicycle 4 when positioned on a sloped surface.

In an embodiment, the stem 7 may project substantially perpendicularly from the first wheel 6, optionally from the centre 14 of the first wheel 6. Advantageously, the stem 7 may be fully or partially surrounded by a plain bearing 15, such as a bushing 16. The plain bearing 15 may be connected to the first wheel 6 to allow the first wheel 6 to freely rotate about the axle 2 when the axle 2 is engaged with the stem 7. Alternatively, the first wheel 6 may comprise ball bearings to allow the wheel to freely rotate about the axle 2.

Advantageously, the circumference of the second wheel 8 may be smaller than the circumference of the first wheel 6. Thus, in use, the freely pivotable first wheel 6 may be rollable along a surface and maintain the fork 3 of the bicycle 4 spaced apart from the surface and without the second wheel 8 contacting the surface.

The second wheel 8 may act as a handle 17 to be grasped by a user to position the axle 2 in the stem 7 of the first wheel 6. The second wheel 8 may comprise any suitable configuration and thus may comprise a circular or polygonal configuration which may substantially reflect the configuration of the first wheel 6. The second wheel 8 may be rotated to screw the axle 2 into the stem 7 of the first wheel 6 along a threaded portion of the axle 2 corresponding to threaded walls of the stem 7.

Alternatively, the axle 2 may engage the stem 7 of the first wheel 6 by any suitable means.

In use, an embodiment of the bicycle fork protector 1 of the invention may be clamped to the fork 3 of a bicycle 4 by placing the first wheel 6 and second wheel 8 at opposing sides of the dropout slot 18 located at the end of the fork blade 12 and placing the axle 2 into the dropout slot 18. A first washer 19 may be positioned about the open mouth of the hollow stem 7. The first washer 19 may also abut the axle 2 when the axle 2 is engaged with the first wheel 6. A second washer 20 may abut the axle 2 adjacent to the second wheel 8. In use, the first and second washers 19,20 also abut the opposing sides of, and so protect, the dropout slot 18 located at the end of the fork blade 12. The second wheel 8 may be manipulated to insert the axle 2 into the stem 7 of the first wheel 6 and may further be rotated to screw the axle 2 into the stem 7. The screwing of the axle 2 into the stem 7 of the first wheel 6 results in a closing of the gap between the first 6 and second wheel 8 until the bicycle fork protector 1 engages, for example is securely clamped to, the blade 12 of the bicycle fork 3. A second bicycle fork protector 1 may be secured in the same way to the second blade 12 of the fork 3.

Figure 6:
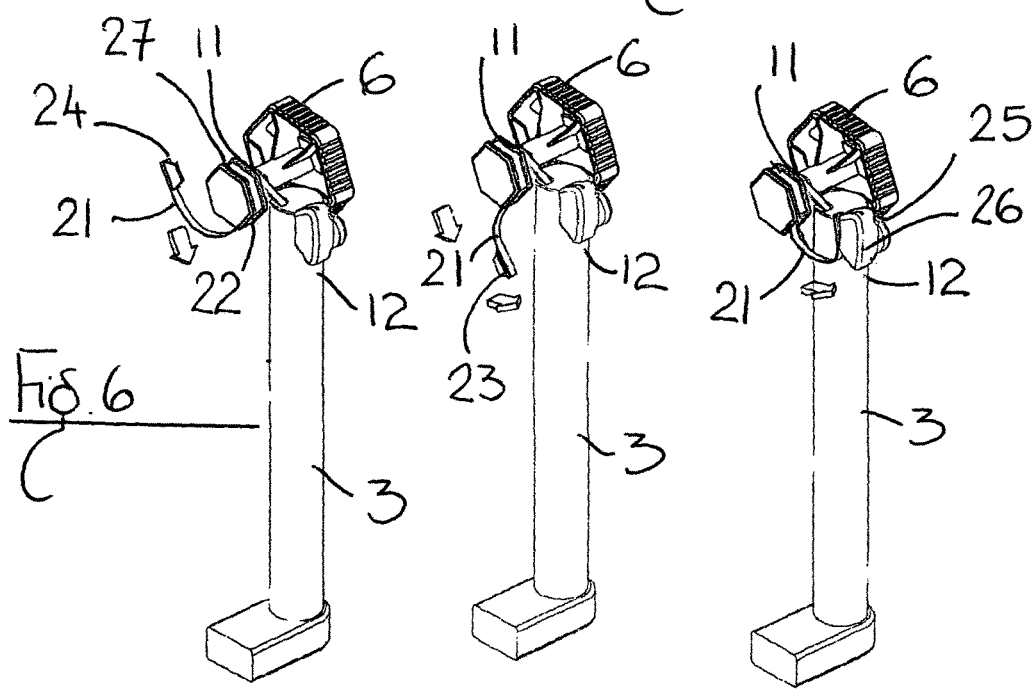
FIG. 6 is a sequential perspective view from above and one side of the fork protector engaged to the end of a blade of the front fork of a bicycle, the three images of the sequence depicting the unwinding of the strap and plate of the brake pad separator from the second miniature wheel of the fork protector and the insertion of the plate into the front brake calliper in the direction indicated by the arrows.

In a further embodiment, the second wheel 8 additionally comprises a brake pad separator in the form of a strap 21 having first and second opposing ends 22,23, wherein the first end 22 is attached to the second wheel 8 and the second end 23 comprises a plate 24 suitable for insertion between the brake pads 25 of a brake calliper 26. The first end 22 of the strap 21 may be integrally formed with the second wheel 8. Advantageously, the second wheel 8 may comprise a recess 27 about its circumferential edge in which the brake pad separator i.e. the strap 21 and/or plate 24 may be stored when not in use. As illustrated in FIG. 6, the strap 21 and plate 24 of the brake pad separator may, in use, be unwound from the second wheel 8. Advantageously the first end of the strap 22 remains attached to the second wheel 8 and the plate 24 may be inserted between the brake pads 25 of the brake calliper 26. The plate 24 may be inserted by sliding the plate 24 between the brake pads 25 and thus may be referred to as a "slider".

The strap 21 may be formed of any suitable material and may be, for example, rubber. Similarly, the plate 24 may be formed of any suitable material. The plate 24 may be formed, for example, of a hard plastics material. The plate 24 may be of any size suitable for maintaining a space between the pads 25 of the brake calliper 26. The size of the plate 24 may be readily determined based on the type of brake calliper 26 on the bicycle 4.

Figure 7:
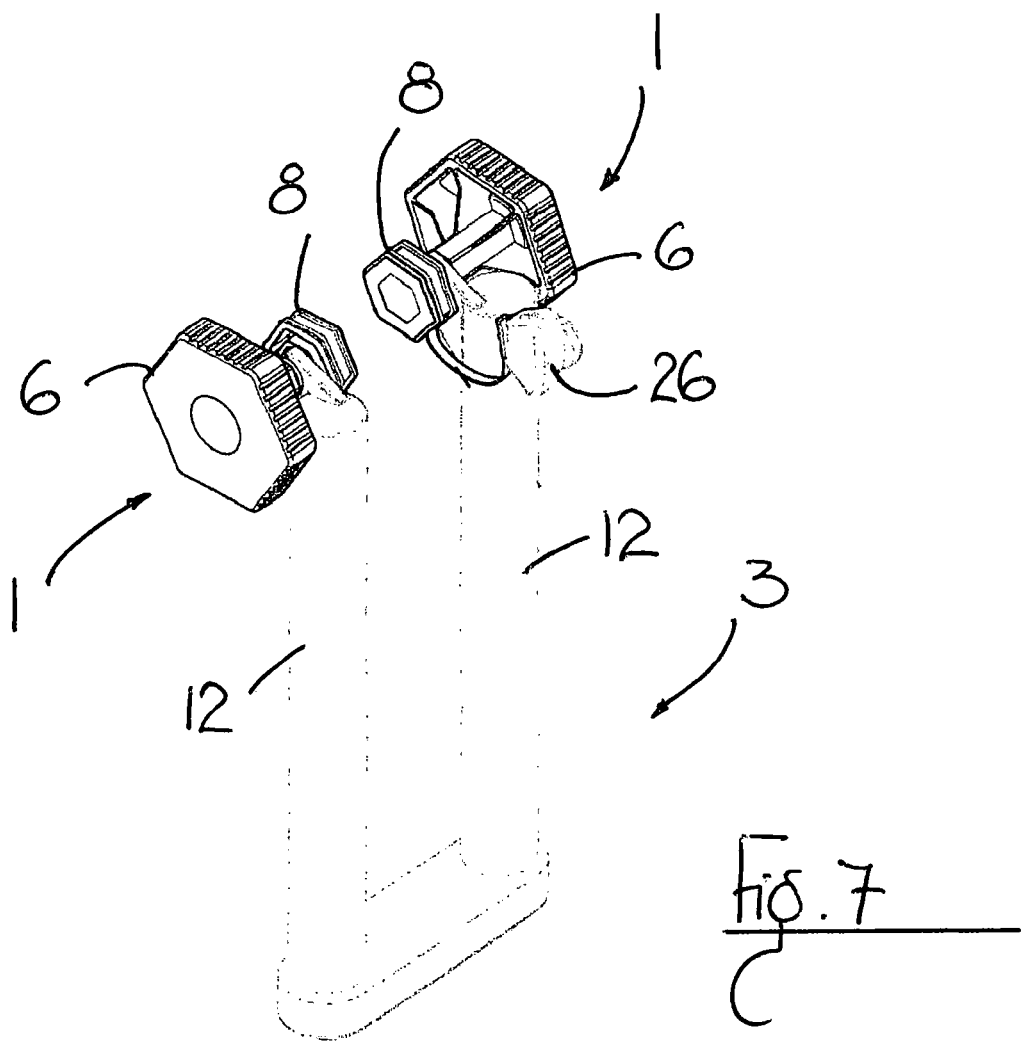
FIG. 7 is a perspective view from above and one side of the front fork of a bicycle to which the fork protector has been engaged to each blade of the fork with one fork protector being depicted as having a brake pad separator comprising a strap and plate inserted into the front brake calliper as shown in FIG. 6.

It will be appreciated that a bicycle 4 generally comprises one brake calliper 26 on one or both of the front and rear forks 3,13. Thus each fork 3,13 of a bicycle 4 may be appropriately protected using one bicycle fork protector 1 having a strap 21 and plate 24 suitable for insertion between the brake pads 25 of a brake calliper 26 and one bicycle fork protector 1 without these features (see FIG. 7).

FIGS. 8 to 14 show a second embodiment of a fork protector 1 of the invention in which the fork protector 1 is a double fork protector 1 provided with an axle 2 having a wheelset 5 made up of two protective miniature primary wheels 6 of equal size to simultaneously protect both blades 12 of the fork 3 of a bicycle 4. The fork protector 1 of the present embodiment is broadly similar to the fork protector 1 of FIGS. 1 to 7. Like numerals indicate like parts.

As shown in the drawings, the double fork protector 1 of the present embodiment has an axle 2 with a primary protective wheel 6 at each end thereof i.e. the secondary handle-like wheel 8 of the first embodiment has been replaced by a miniature primary protective wheel 6 in the present embodiment. In order to accommodate the second primary wheel 6, the axle 2 is extended to include a central rod 28 extending between the stems 7 of the primary wheels 6. A coupling 29 for engagement with each dropout slot 18 of the two blades 12 of the fork 3 and which also serves as a dropout spacer is provided each side of the central rod 28. Each coupling 29 is in the form of an annular slot 29 defined between two pairs of first and second washers 19,20. The annular slots 29 are dimensioned and spaced apart on the axle 2 to hold the dropout slots 18 of the blades 12 of the fork 3 of a bicycle the correct distance apart to maintain the spatial integrity and orientation of the fork 3 and in particular the dropouts 11.

As shall be explained more fully below, the rod 28 is further provided with a centrally located pair of spaced apart outwardly projecting rings 30,31 to define a stand mounting 32 between the rings in the form of a groove 33 lined with grips 34.

As with the first embodiment of the invention, the primary wheels 6 are rotatably mounted on the axle 2 so that the fork protector 1 can be tightened and loosened at the couplings 29 to secure the fork protector 1 to bicycle dropouts 11. The primary wheels 6 are therefore each provided with a dial 35 on their external face grippable by a user to rotate the primary wheels 6 as required.

In contradistinction with the fork protector of FIG. 1, the wheel rims 36 of the wheels 6 of the present embodiment are provided with grip-like notches 37 to prevent uncontrolled rolling of the wheels 6 on surfaces in use. This shall be explained more fully below.

Figure 13:
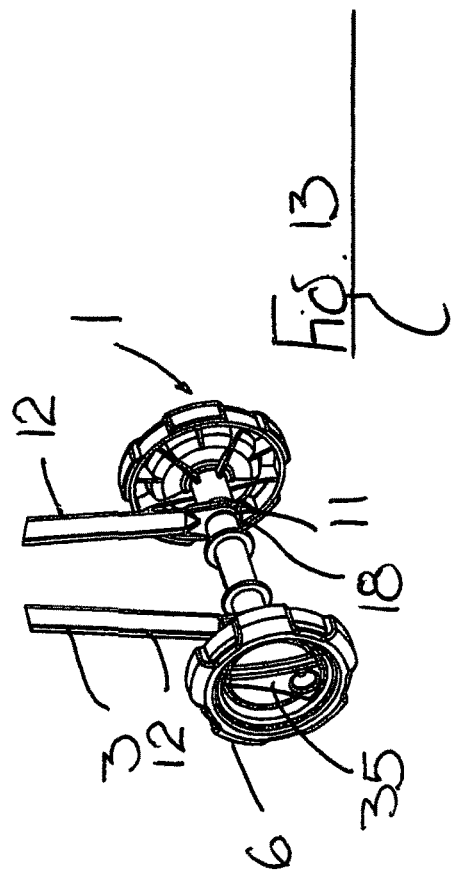
FIG. 13 is an enlarged perspective view from above and one side of the double fork protector of FIG. 12 engaged with the two dropouts of the front fork.
Figure 14:
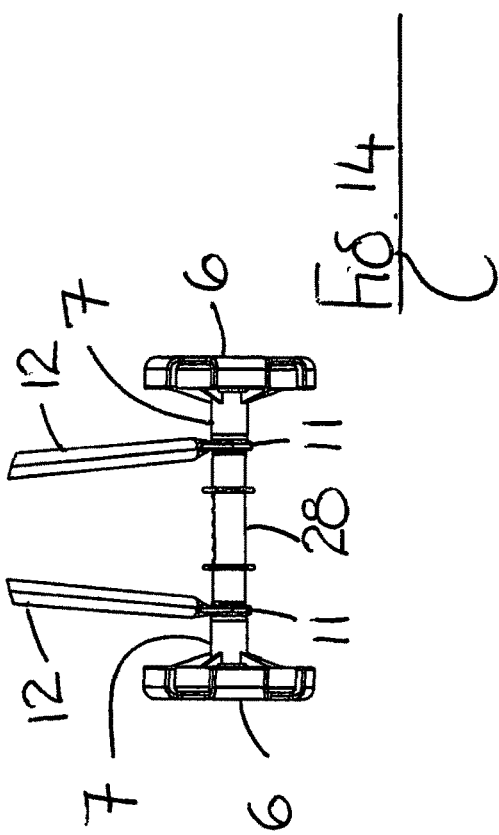
FIG. 14 is an enlarged front plan view of the double fork protector in the two dropouts of the front fork.
Figure 12:
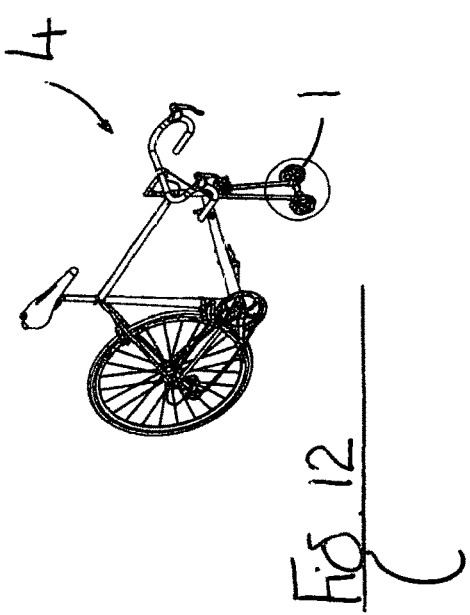
FIG. 12 is a perspective view from above and one side of a bicycle fitted with the double fork protector on the front fork of the bicycle.

In use, the double fork protector 1 of the invention is placed on a bicycle 4 substantially as hereinbefore described and as shown in FIGS. 12 to 14. More particularly, when used on the front fork 3 of a bicycle 4, the front wheel of the bicycle is first removed (generally with the bicycle 4 upside down to avoid damage to the front fork 3). The double fork protector 1 is then positioned at the dropout slots 18 of each blade 12 of the fork 3 so that the coupling slots 29 on the axle 2 are aligned with the dropout slots 18. The double fork protector 1 is then urged into the dropout slots 18 and tightened in place by rotating the primary wheels 6 using the dials 35.

The bicycle 4 can then be returned to the upright, albeit inclined, position shown in FIG. 12 and rest on the double fork protector 1 at the front fork 3 without damaging the front fork 3. Moreover, the notches 37 on the wheel rims 36 prevent uncontrolled movement of the fork protector 1 (and hence the bicycle 4) although the fork protector 1 and the bicycle 4 can be rolled forwards and backwards in a controlled manner if desired.

The fork protector 1 can be simply removed from the fork 3 by reversing the above process.

As indicated above, the double fork protector 1 is adapted for use with a stand so that the bicycle 4 can be returned to a fully upright position with the fork protector 1 in situ.

FIGS. 15 to 21 show the double fork protector 1 and associated stand 38, moveable between a folded position and an upright operating position, which make up a fork protector kit adapted to support a bicycle 4 with its wheel(s) removed.

As shown in the drawings, the stand 38 is generally A-shaped and is made up of a major leg 39 and a dog-leg shaped minor leg 40 attached to the major leg 39 at a dual function clamp cum hinge 41 so that the stand 38 is moveable about the hinge 41 between a standing position to support and clamp the fork protector 1 (and a bicycle 4 to which the fork protector is attached) and a collapsed or folded position as shown particularly in FIG. 15.

The major leg 39 is made up of an elongate two-part channel-shaped housing 42 formed from a first wall 43 and a second wall 44 attached to the first wall 43 and defining a channel 45 therebetween. The channel 45 is shaped and dimensioned to receive the minor leg 40 in the folded position while both the major leg 39 and the minor leg 40 are both provided with feet 46 at their free ends remote from the hinge 41.

As indicated above, the major leg 39 and the minor leg 40 together define a clamp-like fork protector mounting 47 at the hinge 41. The fork protector mounting 47 is made up of a seat in the form of an indented notch 48 in the major leg 39 at the hinge 41 for receiving the fork protector 1 at the recessed groove 33 on the axial rod 28. The indented notch 43 is sized and dimensioned to sit into the recessed groove 33 to prevent lateral movement of the rear derailleur protector 1 in the indented notch 48.

Moreover, the fork protector mounting 47 is further made up of the dog-leg end 49 of the minor leg 40 which is located towards the hinge 41 but oriented away from the hinge 41. More particularly, as shown in FIGS. 16 and 17, a face 50 of the dog-leg end 49 is oriented towards the indented notch 48 and is provided with a recessed bearing 51 to hold the axle 2 of the fork protector 1 in place in the seat defined by the indented notch 48 i.e. movement of the minor leg 40 about the clamp cum hinge 41 causes the dog-leg end 49 to move into and out of the indented notch 48 to open and close the indented notch 48.

Accordingly, in use, the fork protector 1 of the invention is first attached to the fork 3 of a bicycle 4 as previously described and the stand 38 is placed in an upright open position as shown in FIG. 15 by adjusting the major and minor legs 39,40 so that the seat for receiving the fork protector 1 defined by the indented notch 48 is open i.e. dog-leg end 49 of the minor leg 40 is not fully inserted in the indented notch 48. The front fork 3 of the bicycle 4 fitted with the fork protector 1 is then positioned over the stand 38 and the axle 2 of fork protector 1 is guided into the open indented notch 48. The downward force exerted by the bicycle 4 on the stand 38 then causes the major leg 39 and the minor leg 40 to move apart at the feet 46 so that the major and minor legs 39,40 pivot at the clamp cum hinge 41 with the result that the dog leg end 49 of the minor leg 40 bears down on the axle 2 of the fork protector 1 at the recessed bearing 51 to clamp the fork protector 1 in place in the fork protector mounting 47. The fork protector 1 is therefore prevented from exiting the indented notch 48 by the dog-leg end 49 of the minor leg 40. As shown in FIGS. 19 to 21, a bicycle 4 with the front wheel removed can therefore be securely supported by the fork protector 1 and stand 38.

Alternatively, the fork protector 1 can be simply positioned in the clamp cum hinge 41 of the upright stand 38 and the fork 3 of the bicycle 4 from which the wheel has been removed positioned over the fork protector 1. The dropout slots 18 can then be simply "dropped" gently onto the fork protector 1 to attach the fork protector 1 in the stand 38 to the bicycle 4.

In order to remove the fork protector 1 from the stand 8, i.e. unclamp the fork protector 1, the bicycle 4 is simply raised by the user so that the upwards force or movement of the fork protector 1 against the dog-leg end 49 of the minor leg 40 in the stand 38 urges the recessed bearing 51 and the dog-leg end 49 of away from axle 2 to open the seat defined by the indented notch 48.

In a further embodiment of the invention, the screw-on/off mechanism of the handle 17 and wheels 6 can be replaced by a quick release coupling if desired.

FIGS. 22 and 23 show a third embodiment of a fork protector 1 of the invention in which the fork protector 1 is adapted for use with bicycle forks 3 having dropouts 11 in the form of through-holes 52. The fork protector 1 of the present embodiment is broadly similar to the fork protector of FIGS. 8 to 14 and like numerals indicate like parts. However, as shown in the drawings, in the present embodiment, the axle 2 is replaced by a spring-loaded telescopic axle 2 for insertion between the through-holes 52.

More particularly, the spring-loaded telescopic axle 2 is made up of an outer cylinder 53 having a spring-loaded inner cylinder 54 slidably mounted inside the outer cylinder 53 with the spring biased to urge the spring-loaded inner cylinder 54 from the outer cylinder 53. Each of the outer and inner cylinders 53,54 is provided with a through-hole pin 55 at their free end.

In use, either pin 55 of the telescopic axle 2 is first placed in a through hole 52 as shown in FIG. 22 in a first dropout 11. The axle 2 is then placed against the second dropout 11 of the fork 3 at the other pin 55. The pin 55 and hence the second cylinder 54 is therefore urged inwards by the dropout 11 until the pin 55 is guided towards the second through-hole 55 whereupon the pin 55 on the inner cylinder 54 is urged into the through-hole 55 by the spring. The axle 2 can then be fixed at the correct length in the through-holes 55 by a C-clamp 56.

As indicated above, the fork protector 1 of the invention can be dimensioned as required in accordance with bicycle component sizes. For example, the axle can be dimensioned to accommodate front for standard sizes of 100 mm and 110 mm and rear fork sizes between 125 mm and 145 mm. However, as will be appreciated by those skilled in the art, the fork protector 1 of FIGS. 22 and 23 can be used with a range of sizes due to the telescopic nature of the axle 2.

The invention claimed is:

1. A bicycle fork protector comprising:
a wheelset having two wheels, and
an axle on the wheelset for engaging a bicycle fork wherein one of the two wheels comprises a handle.

2. A bicycle fork protector as claimed in claim 1 wherein the wheels comprise at least one flat side.

3. A bicycle fork protector as claimed in claim 2 wherein the at least one flat side comprises a plurality of flat sides.

4. A bicycle fork protector as claimed in claim 1 wherein the wheels are rotatably mounted on the axle.

5. A bicycle fork protector as claimed in claim 1 wherein the axle comprises a coupling for engaging a bicycle fork.

6. A bicycle fork protector as claimed in claim 5 wherein the coupling comprises a slot for engaging a bicycle fork dropout.

7. A bicycle fork protector as claimed in claim 6 wherein the coupling comprises a dropout slot spacer to maintain a spatial arrangement of the fork dropout.

8. A fork protector kit comprising a fork protector having a wheelset having at least one wheel,
an axle on the wheelset for engaging a bicycle fork and an A-shaped stand to hold the fork protector, the stand comprising a fork protector clamp mounting for holding the fork protector wherein the A-shaped stand comprises a major leg and a minor leg connected to the major leg at a hinge, the stand being moveable between a folded position and an upright position about the hinge.

9. A fork protector kit as claimed in claim 8 wherein the hinge comprises a dual function hinge clamp to clamp the fork protector in the upright position.

10. A fork protector kit as claimed in claim 8 wherein the major leg comprises a housing to receive the minor leg in the folded position.

11. A fork protector kit as claimed in claim 8 wherein the minor leg comprises a dog-leg shape.

* * * * *